(12) United States Patent
Hegna

(10) Patent No.: US 11,092,710 B2
(45) Date of Patent: Aug. 17, 2021

(54) INVERSION TECHNIQUES USING STREAMERS AT DIFFERENT DEPTHS

(71) Applicant: PGS Geophysical AS, Lysaker (NO)

(72) Inventor: Stian Hegna, Hovik (NO)

(73) Assignee: PGS GEOPHYSICAL AS, Oslo (NO)

( * ) Notice: Subject to any disclaimer, the term of this patent is extended or adjusted under 35 U.S.C. 154(b) by 2011 days.

(21) Appl. No.: 14/074,190

(22) Filed: Nov. 7, 2013

(65) Prior Publication Data

US 2015/0003197 A1 Jan. 1, 2015

Related U.S. Application Data

(60) Provisional application No. 61/840,452, filed on Jun. 27, 2013.

(51) Int. Cl.
*G01V 1/38* (2006.01)
*G01V 1/28* (2006.01)
*G01V 1/36* (2006.01)

(52) U.S. Cl.
CPC .................. *G01V 1/38* (2013.01); *G01V 1/28* (2013.01); *G01V 1/36* (2013.01); *G01V 2210/56* (2013.01)

(58) Field of Classification Search
CPC .............................. G01V 1/38; G01V 2210/56
USPC .......................................................... 367/21
See application file for complete search history.

(56) References Cited

U.S. PATENT DOCUMENTS

| H001490 H | 9/1995 | Thompson et al. |
| 6,704,244 B1 * | 3/2004 | Vaage .................... G01V 1/36 181/110 |
| 6,903,998 B2 | 6/2005 | Vaage |
| 7,123,543 B2 | 10/2006 | Vaage et al. |
| 7,239,577 B2 | 7/2007 | Tenghamn et al. |
| 7,340,348 B2 | 3/2008 | Strack et al. |

(Continued)

FOREIGN PATENT DOCUMENTS

| EP | 2180346 | 4/2010 |
| EP | 2259091 | 12/2010 |

(Continued)

OTHER PUBLICATIONS

Nick Moldoveanu, et al., "Over/under towed-streamer acquisition: A method to extend seismic bandwidth to both higher and lower frequencies," The Leading Edge, Jan. 2007, pp. 41-58.
R. Winnett, et al., "A new marine broadband acquisition and processing method," No. 17249—75th EAGE Conference & Exhibition incorporating SPE EUROPEC Jun. 10-13, 2013, 5 pages.
WesternGeco, Acoustic Inversion of DISCover Data—Case Study: Enhanced low frequencies open up a new dimension in geological mapping, 2010, 2 pages.

(Continued)

*Primary Examiner* — Ian J Lobo

(57) ABSTRACT

Techniques are disclosed relating to geophysical surveying and data processing using streamers at different depths. In one embodiment, a method includes obtaining geophysical data specific to a geophysical formation that includes a first set of data representative of a first particle motion signal and a first pressure signal recorded using sensors at a first depth and a second set of data representative of a second particle motion signal and a second pressure signal recorded using sensors at a second, greater depth. In this embodiment, the method includes generating first and second wave separation equations from the first and second sets of data and determining a cross-line wavenumber value that reconciles the first and second equations. The determined cross-line wavenumber may be used to separate measured up-going and down-going wavefields.

18 Claims, 7 Drawing Sheets

(56) References Cited

U.S. PATENT DOCUMENTS

| | | | |
|---|---|---|---|
| 7,359,283 B2 * | 4/2008 | Vaage | G01V 1/3808 367/15 |
| 7,446,535 B1 | 11/2008 | Tenghamn et al. | |
| 7,450,467 B2 | 11/2008 | Tveide et al. | |
| 7,453,763 B2 | 11/2008 | Johnstad | |
| 7,567,084 B2 | 7/2009 | Eidesmo et al. | |
| 7,616,523 B1 | 11/2009 | Tabti et al. | |
| 7,684,281 B2 | 3/2010 | Vaage et al. | |
| 7,705,599 B2 | 4/2010 | Strack et al. | |
| 7,796,466 B2 | 9/2010 | Combee et al. | |
| 7,800,374 B2 | 9/2010 | Strack et al. | |
| 7,872,477 B2 | 1/2011 | Strack et al. | |
| 7,912,649 B2 | 3/2011 | Harris et al. | |
| 8,004,930 B2 | 8/2011 | Welker et al. | |
| 8,060,314 B2 | 11/2011 | Welker | |
| 8,077,542 B2 | 12/2011 | Gulbransen et al. | |
| 8,098,542 B2 | 1/2012 | Hillesund et al. | |
| 8,116,166 B2 | 2/2012 | Robertsson et al. | |
| 8,148,990 B2 | 4/2012 | Helwig et al. | |
| 8,183,868 B2 | 5/2012 | Summerfield et al. | |
| 8,260,555 B2 | 9/2012 | Welker | |
| 8,363,509 B2 | 1/2013 | Colombo et al. | |
| 8,467,264 B2 | 6/2013 | Keers et al. | |
| 8,526,268 B2 | 9/2013 | van den Berg et al. | |
| 2009/0067285 A1 * | 3/2009 | Robertsson | G01V 1/3808 367/24 |
| 2009/0245021 A1 * | 10/2009 | Robertsson | B63B 21/56 367/21 |
| 2009/0290448 A1 * | 11/2009 | Vassallo | G01V 1/3808 367/21 |
| 2010/0045295 A1 | 2/2010 | Mittet et al. | |
| 2010/0074049 A1 * | 3/2010 | Kragh | G01V 1/3808 367/16 |
| 2010/0103771 A1 | 4/2010 | Gulbransen et al. | |
| 2010/0142317 A1 | 6/2010 | Moldoveanu et al. | |
| 2010/0157728 A1 | 6/2010 | Gulbransen | |
| 2010/0274492 A1 * | 10/2010 | Rentsch | G01V 1/3808 702/14 |
| 2010/0280773 A1 | 11/2010 | Saether | |
| 2011/0051551 A1 | 3/2011 | Tenghamn | |
| 2011/0058450 A1 * | 3/2011 | van den Berg | G01V 1/36 367/24 |
| 2011/0108283 A1 | 5/2011 | Srnka et al. | |
| 2011/0158041 A1 | 6/2011 | Moldoveanu et al. | |
| 2011/0158042 A1 | 6/2011 | Moldoveanu et al. | |
| 2011/0158043 A1 | 6/2011 | Johnstad | |
| 2011/0242935 A1 | 10/2011 | Amundsen et al. | |
| 2011/0255369 A1 | 10/2011 | Harrick et al. | |
| 2012/0033526 A1 * | 2/2012 | Hegna | G01V 1/364 367/21 |
| 2012/0081995 A1 | 4/2012 | Hillesund et al. | |
| 2012/0184161 A1 | 7/2012 | Voisin et al. | |
| 2012/0230150 A1 * | 9/2012 | Sudow | G01V 1/3817 367/19 |
| 2012/0250456 A1 | 10/2012 | Tenghamn | |
| 2012/0250457 A1 | 10/2012 | Rickert et al. | |
| 2013/0028049 A1 * | 1/2013 | Pan | G01V 1/36 367/24 |
| 2013/0088235 A1 * | 4/2013 | Hegna | G01V 1/3808 324/334 |
| 2013/0272090 A1 | 10/2013 | Peppe et al. | |
| 2014/0043939 A1 * | 2/2014 | Vasconcelos | A61B 8/00 367/73 |
| 2014/0254314 A1 * | 9/2014 | Sudow | G01V 1/201 367/15 |

FOREIGN PATENT DOCUMENTS

| | | |
|---|---|---|
| GB | 2511642 | 9/2014 |
| WO | 2009/02719 | 12/2008 |
| WO | 2009035787 A2 | 3/2009 |

OTHER PUBLICATIONS

B. J. Posthumus, "Deghosting Using a Twin Streamer Configuration," Geophysical Prospecting 41, 1993, pp. 267-286.

José Antonio Escalera Alcocer, et al., "Reducing uncertainty by integrating 3D CSEM in the Mexican deep-water exploration workflow," First Break—EAGE, vol. 31, Apr. 2013, pp. 75-79.

Johan Mattsson, et al., "Error Analysis and Capability Modelling for Towed Streamer Electromagnetics," First Break, Aug. 2012, pp. 91-96, vol. 30.

Chris Anderson, et al., "An Integrated Approach to Marine Electromagnetic Surveyinig Using a Towed Streamer and Source"First Break, May 2010, pp. 71-75, vol. 28.

Philip B. Duran, "The Use of Marine Electromagnetic Conductivity as a Tool in Hydrogeologic Investigations", Association of Ground Water Scientists and Engineers, Mar.- Apr. 1987, pp. 160-166.

Johan Mattsson, et al., "Towed Streamer EM: The Challenges of Sensitivity and Arisotropy"First Break, Jun. 2013, pp. 155-159, vol. 31.

United Kingdom Search Report dated Dec. 1, 2014, in the prosecution of patent application GB1411460.7, 4 pages.

M.Vassalllo et al., "Matching Pursuit Methods Applied to Multicomponent Marine Seismic Acquisition—The issue of Crossline Aliasing", 73rd EAGE Conference & Exhibition incorporating SPE EUPOPEC 2011, May 23-26, 2011, 5 pages, A043, Vienna, Austria.

Examination Report in Australian Application No. 2014203490 dated Oct. 9, 2017, 3 pages.

United Kingdom Search Report on Application No. GB1411450.8, dated Sep. 30, 2014, 3 pages.

* cited by examiner

INVERSION TECHNIQUES USING STREAMERS AT DIFFERENT DEPTHS

This application claims the benefit of U.S. Provisional Application No. 61/840,452, filed on Jun. 27, 2013, which is incorporated by reference herein in its entirety. This application is related to U.S. application Ser. No. 14/074,080, filed on Nov. 7, 2013, entitled "SURVEY TECHNIQUES USING STREAMERS AT DIFFERENT DEPTHS," which is incorporated by reference herein in its entirety.

BACKGROUND

Geophysical surveys are often used for oil and gas exploration in geophysical formations, which may be located below marine environments. Various types of signal sources and geophysical sensors may be used in different types of geophysical surveys. Electromagnetic (EM) surveys, for example, may be conducted using EM signals transmitted by an EM source and detected by EM sensors. Seismic geophysical surveys, for example, are based on the use of acoustic waves. In seismic surveys, a survey vessel may tow an acoustic source (e.g., an air gun or a marine vibrator) and a plurality of streamers along which a number of acoustic sensors (e.g., hydrophones and/or geophones) are located. Acoustic waves generated by the source may then be transmitted to the earth's crust and then reflected back and captured at the geophysical sensors. Data collected during a marine geophysical survey may be analyzed to locate hydrocarbon-bearing geological structures, and thus determine where deposits of oil and natural gas may be located.

During a seismic survey, up-going wavefields may reflect from the water surface, resulting in down-going ghost signals that may be detected by geophysical sensors along with desired up-going wavefields from the formation. Ghost signals may attenuate the up-going wavefield and cause notches in measured signals at particular frequencies. Reduction or elimination of these notches may improve survey resolution.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

Further, as used herein, the terms "first," "second," "third," etc. do not necessarily imply an ordering (e.g., temporal) between elements. For example, a reference to a "first" sensor and a "second" sensor may refer to any two different sensors. In short, references such as "first," "second," etc. are used as labels for ease of reference in the description and the appended claims.

Figure 1:
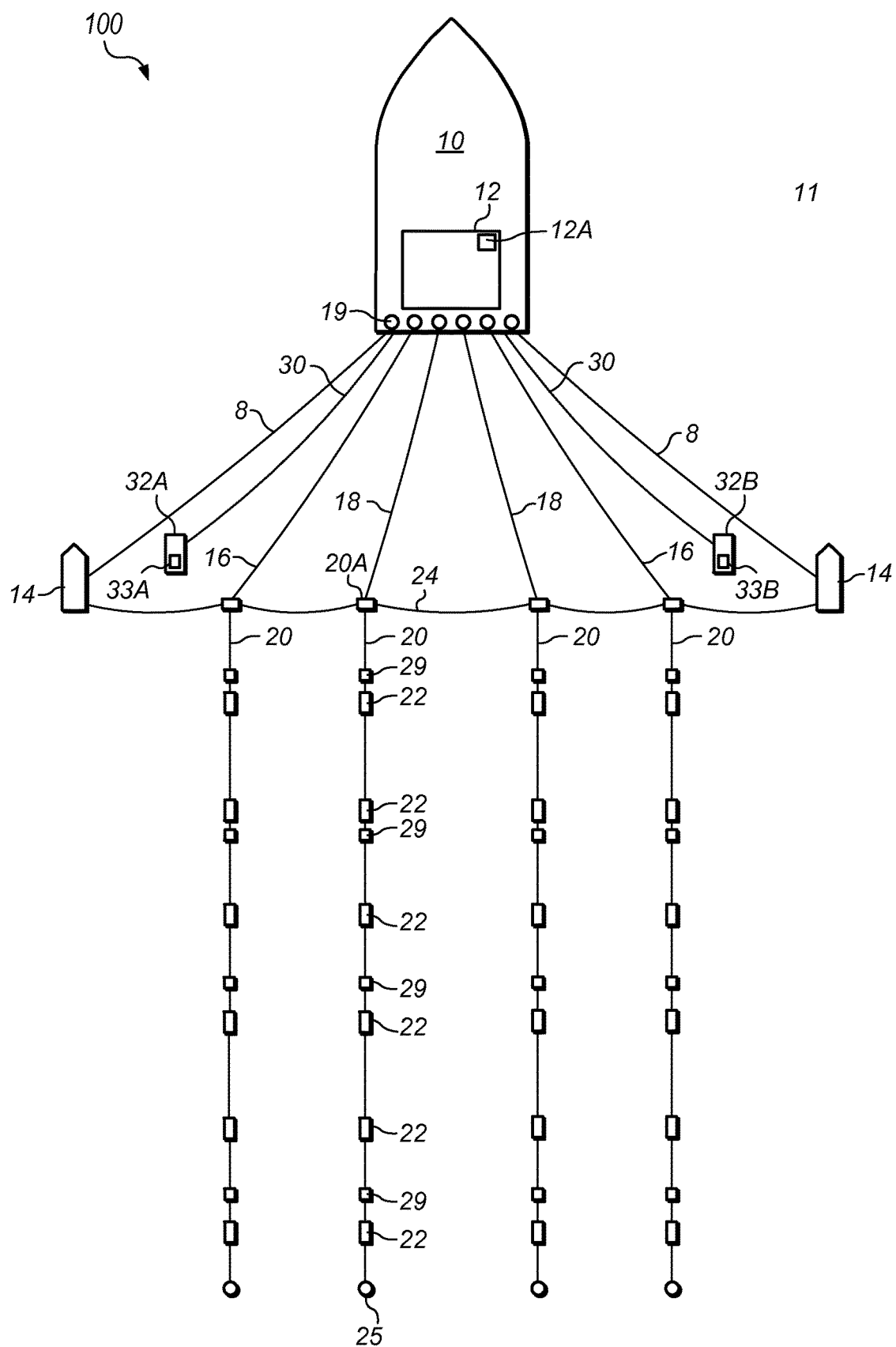
FIG. 1 is a block diagram illustrating one embodiment of a geophysical survey system.

This disclosure initially describes, with reference to FIG. 1, an overview of a geophysical survey system. It then describes an exemplary geophysical survey system with streamers at different depths with reference to FIG. 2. Ghost functions for geophysical sensors at different depths and techniques for combining data from geophysical sensors at different depths are described with reference to FIGS. 3-8. In some embodiments, the techniques disclosed herein may improve survey resolution and/or may reduce streamer cost/complexity. Consequently, data collected during such a marine geophysical survey may better predict the location of hydrocarbon-bearing geological structures, and thus better determine where deposits of oil and natural gas may be located.

Referring to FIG. 1, a block diagram illustrating one embodiment of a geophysical survey system 100 is shown. In the illustrated embodiment, system 100 includes survey vessel 10, signal sources 32, paravanes 14, and streamers 20.

Survey vessel 10 may be configured to move along the surface of body of water 11 such as a lake or the ocean. In the illustrated embodiment, survey vessel 10 tows streamers 20, signal sources 32, and paravanes 14. In other embodiments, streamers 20 may be towed by a second survey vessel (not shown), rather than or in addition to survey vessel 10. Survey vessel 10 may include equipment, shown generally at 12 and for convenience collectively referred to as "survey equipment." In still other embodiments, signal sources 32 may be towed by one or more additional survey vessels rather than or in addition to survey vessel 10. Survey equipment 12 may include devices such as a data recording unit (not shown separately) for making a record with respect to time of signals generated by various geophysical sensors in the system 100. Survey equipment 12 may also include navigation equipment (not shown separately), which may be configured to control, determine, and record, at selected times, the geodetic positions of: survey vessel 10, each of a plurality of geophysical sensors 22 and 29 disposed at spaced-apart locations on streamers 20, and/or signal sources 32. Geodetic position may be determined using various devices, including global navigation satellite systems such as the global positioning system (GPS), for example. In the illustrated embodiment, survey vessel 10 includes geodetic positioning device 12A while signal sources 32A and 32B respectively include geodetic positioning devices 33A and 33B.

In the geophysical survey system 100 shown in FIG. 1, survey vessel 10 tows two signal sources 32A-B. In various embodiments, survey vessel 10 may tow any appropriate number of signal sources, including as few as none or as many as 6 or more. The location of the signal sources may be centered behind survey vessel 10 or displaced from the center line, and may be at various distances relative to survey vessel 10, including attached to the hull. Signal sources 32A and 32B may be any type of signal source known in the art. Each signal source 32 may include an array of multiple signal sources. For example, signal source 32A may include a plurality of air guns or EM sources. The term "signal source" may refer to a single signal source or to an array of signal sources. In various embodiments, a geophysical survey system may include any appropriate number of towed signal sources 32. In the illustrated embodiment, signal sources 32 are each coupled to survey vessel 10 at one end through winch 19 or a similar spooling device that enables changing the deployed length of each signal source cable 30. Survey equipment 12 may include signal source control equipment (not shown separately) for selectively operating and maneuvering signal sources 32.

Geophysical sensors 22 and 29 on streamers 20 may be any type of geophysical sensor known in the art. In one embodiment, geophysical sensors 22 are hydrophones while geophysical sensors 29 are geophones. In some embodiments, streamers 20 may include more than two different types of geophysical sensors (additional types not shown). Non-limiting examples of such geophysical sensors may include particle motion responsive seismic sensors such as geophones and accelerometers, pressure responsive seismic sensors such as hydrophones, pressure-time-gradient responsive seismic sensors, electrodes, magnetometers, temperature sensors or combinations of the foregoing. In various implementations of the disclosure, geophysical sensors 22 and 29 may measure, for example, seismic or electromagnetic field energy indicative of the response of various structures in the Earth's subsurface formation below the bottom of body of water 11 to energy imparted into the subsurface formation by one or more of signal sources 32. Seismic energy, for example, may originate from signal sources 32, or an array of such sources, deployed in body of water 11 and towed by survey vessel 10. A wire loop or electrode pair may be used to impart electromagnetic energy, for example. In some embodiments, streamers 20 include tail buoys 25.

In some embodiments, streamers 20 may include devices such as birds (not shown) configured to maintain streamers 20 in a desired position (e.g., at a specified depth and/or lateral displacement). In some embodiments, survey equipment 12 may be configured to tow streamers 20 using various geometries such as different feather angles, depth profiles etc. In some embodiments, streamers 20 may include multiple geodetic positioning devices (not shown).

In the geophysical survey system 100 shown in FIG. 1, survey vessel 10 tows four streamers 20. In various embodiments, survey vessel 10 may tow any appropriate number of streamers, including as few as none or as many as 26 or more. In geophysical survey systems such as shown in FIG. 1 that include a plurality of laterally spaced-apart streamers, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation. In some embodiments, survey vessel 10 may be configured to tow different streamers 20 at different depths, e.g., directly above and below each other and/or at different depths and different lateral displacements from a centerline of survey vessel 10.

Survey equipment 12, in one embodiment, includes a computing system (not shown separately) for, inter alia, processing data from geophysical sensors 22 and 29. In other embodiments, a computing system at another location may process geophysical data gathered by geophysical survey system 100 (e.g., on land after a survey has been conducted). A computing system may include or be configured to access a non-transitory storage medium having instructions stored thereon that are executable to perform various operations described herein. A computing system may include one or more processors configured to execute program instructions to perform various functionality described herein.

Figure 2:
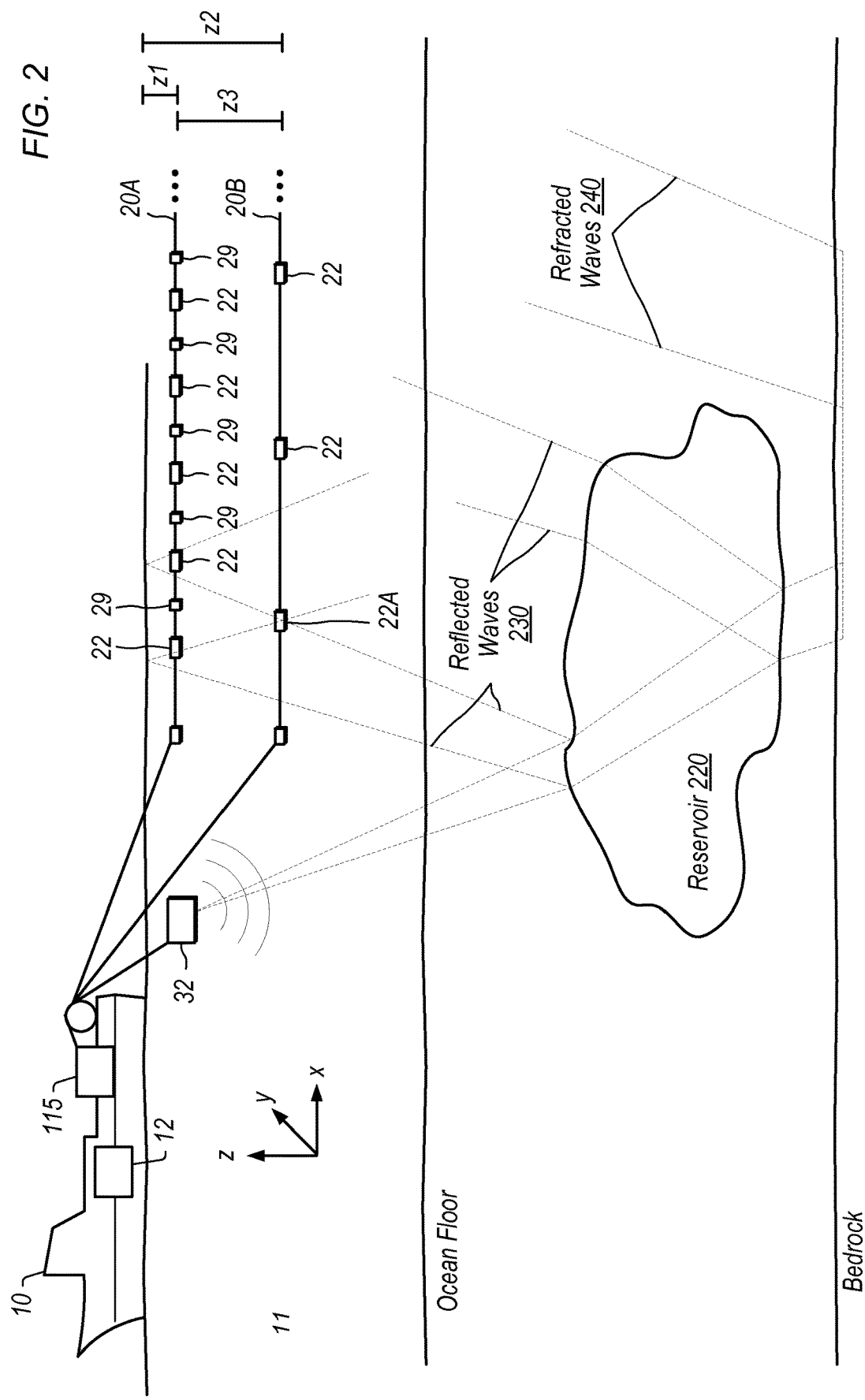
FIG. 2 is a diagram illustrating exemplary ghost signals in a geophysical survey.

Referring now to FIG. 2, a diagram illustrating a side view of one embodiment of a survey vessel 10, streamers 20A-B, and a reservoir 220 is shown.

In the illustrated embodiment, signal source 32 is configured to generate an acoustic wavefield that travels in all directions. The illustrated dashed lines show particular parts of the exemplary wavefield that are reflected and/or refracted by various media. In the illustrated embodiment, reflected waves 230 are reflected from interfaces between reservoir 220 and surrounding strata as well as being refracted at an angle corresponding to the difference in the speed of the acoustic waves in the different media (in the illustrated embodiment, reflection/refraction at the ocean floor and/or between other formations is not shown to simplify illustration). In the illustrated embodiment, some acoustic waves travel along the bedrock and emerge as refracted waves 240. The up-going wavefield may be analyzed to determine information about reservoir 220 and surrounding geophysical formations, for example. The techniques disclosed herein may be used for both reflected and refracted acoustic waves.

As used herein, the term "geophysical formation" refers to any of various compositions or features in the earth and its environment such as rocks, metals, oil reservoirs, or water reservoirs, for example. For example, some formations may be mostly sandstone while other formations may be mostly shale. Geophysical formations may be differentiated from other nearby formations at varying levels of distinctiveness between formations. Thus, this term is not intended to be limited to any particular size, classification, distinctiveness, etc. of formations.

Typically, as shown, acoustic waves may be reflected from the surface of the body of water. The reflected waves are often referred to as "ghost" signals. Down-going ghost signals may interfere constructively or destructively with up-going wavefields depending on the depth of a towed sensor and the wavefield signal frequency. In the illustrated embodiment, geophysical sensor 22A receives both up-going and down-going wavefields from signal source 32. In various embodiments, it may be advantageous to separate the up-going wavefield from the down-going wavefield in order to determine information about subsea geographic formations. Also, more accurate survey results can typically be obtained when analyzing wavefields over a spectrum of frequencies, so avoiding notches in the spectrum (e.g., caused by destructive interference of ghost signals) may be advantageous.

In the illustrated embodiment, survey vessel 10 is configured to tow streamers 20A and 20B at two different depths. The depth of streamer 20A is represented by z1 while the depth of streamer 20B is represented by z2. The vertical distance between the streamers is represented by z3. In the illustrated embodiment, streamer 20A includes geophysical sensors 22 and 29, wherein geophysical sensors 29 are particle motion sensors (which may also be referred to as particle velocity sensors), and geophysical sensors 22 are pressure sensors, while streamer 20B includes only geophysical sensors 22 (i.e. pressure geophysical sensors) but not particle motion sensors. In other embodiments, the deeper streamer 20B may also include particle motions sensors and/or EM sensors, for example. Towing streamers 20A-B at different depths may facilitate separating the up-going and down-going wavefields in various embodiments.

Figure 3:
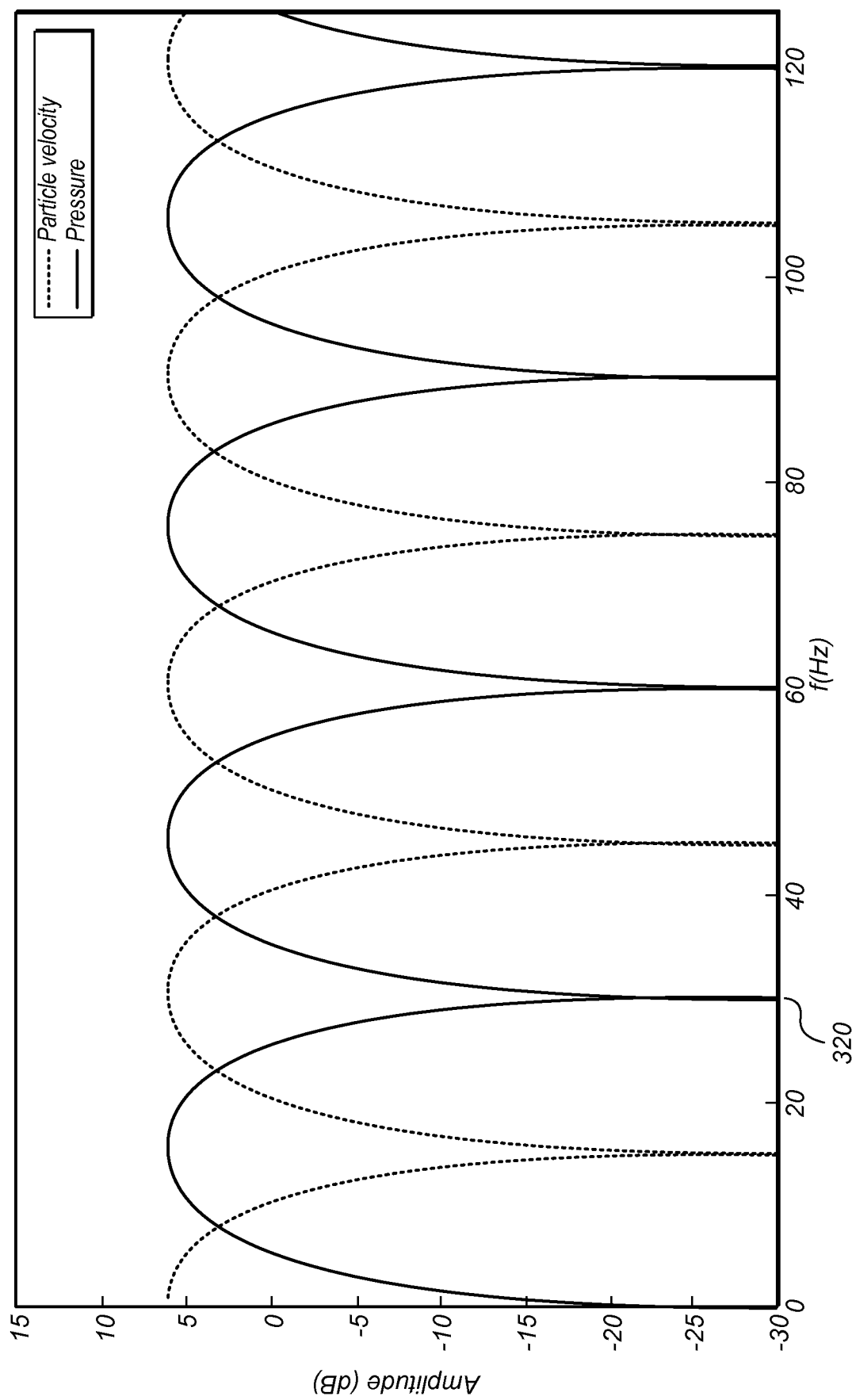
FIG. 3 is a diagram illustrating exemplary ghost function amplitude versus frequency for particle motion signals and pressure signals in one embodiment.
Figure 4:
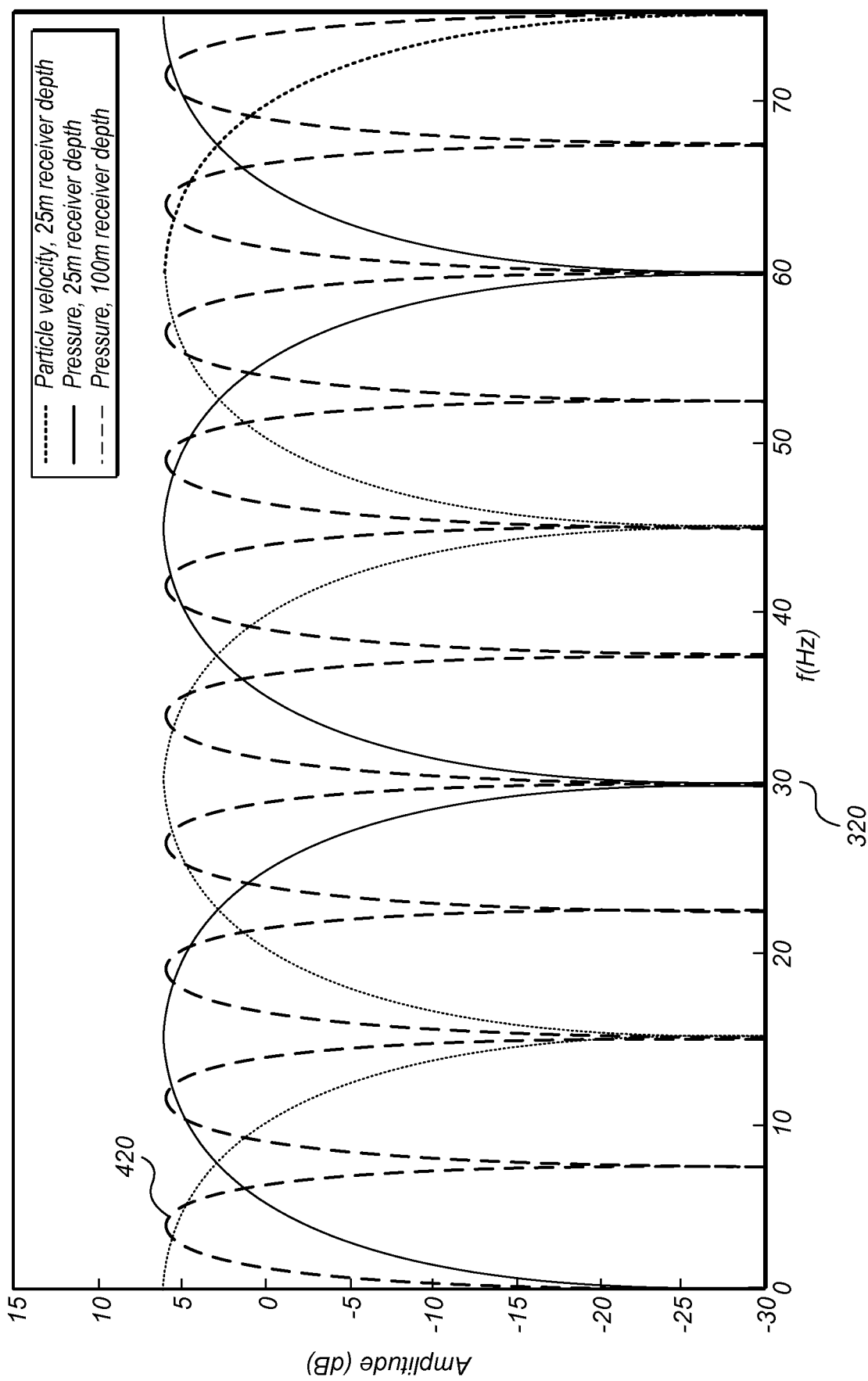
FIG. 4 is a diagram illustrating exemplary ghost function amplitude versus frequency for particle motion signals and pressure signals at different receiver depths in one embodiment.
Figure 5:
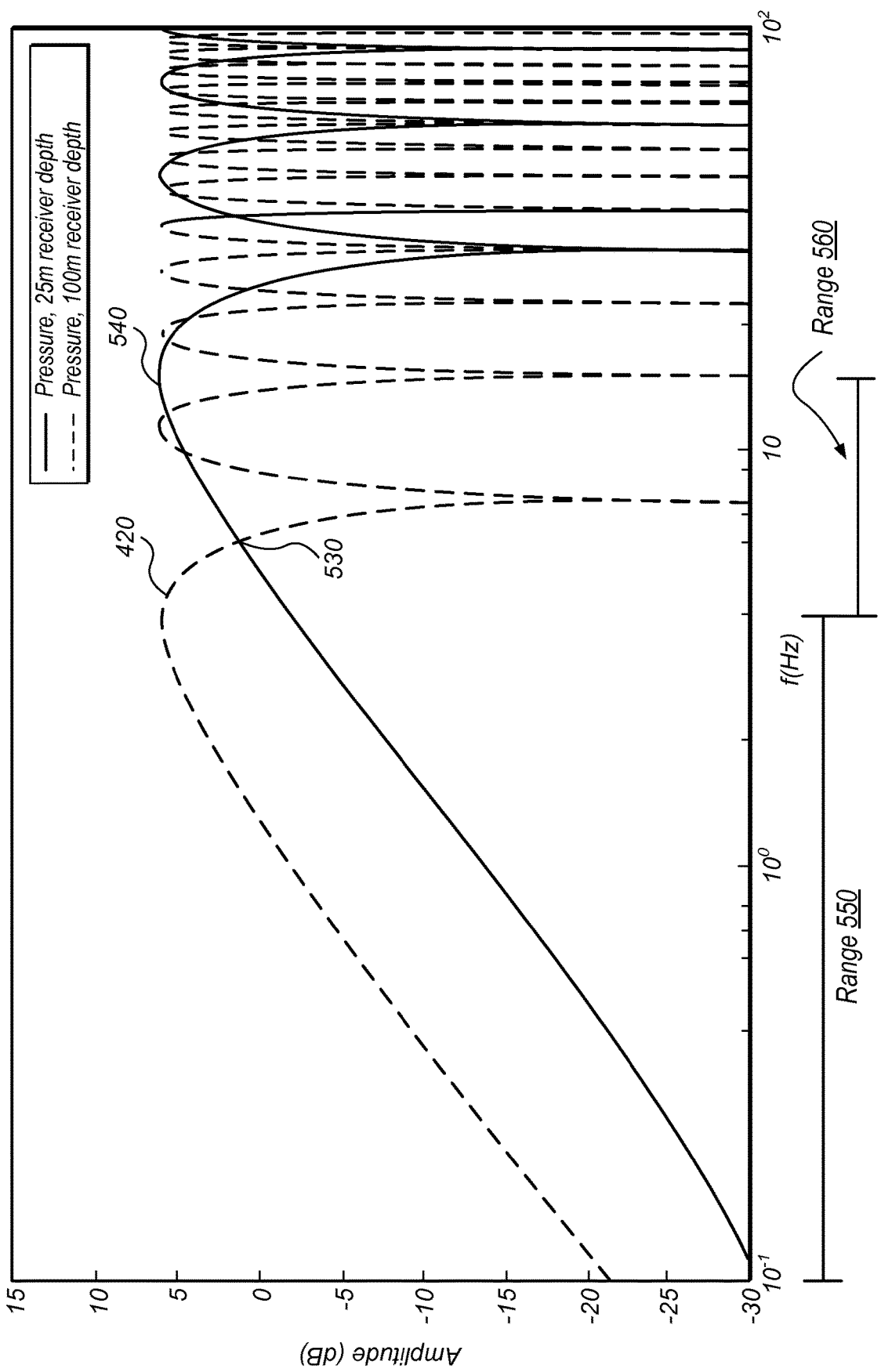
FIG. 5 is a diagram illustrating exemplary ghost function amplitude versus frequency on a logarithmic scale for pressure signals at different receiver depths in one embodiment.

Many variations of streamers towed at different depths may be employed in accordance with this disclosure. Exemplary diagrams corresponding to streamer depths of 25 meters and 100 meters are shown in FIGS. 3-5 to facilitate explanation of one embodiment, but streamers at various depths are contemplated in other embodiments. In some embodiments, multiple streamers may be towed at each depth. In some embodiments, streamers may be towed at multiple different depths (e.g., one or more streamers at 25 m, one or more streamers at 50 m, one or more streamers at 75 m, etc.). In some embodiments, streamers at different depths may be towed directly above and below each other, while in other embodiments streamers at different depths may be offset from each other in the cross-line direction (e.g., the y-direction in FIG. 2). Any of various differences in towing depth (e.g., z3 in FIG. 2) may be implemented in various embodiments. For example, in some embodiments, the difference between z1 and z2 may be ~10 meters, ~50 meters, ~100-200 meters, greater than 200 meters, etc. Further, the shallowest streamer may be towed at any of various different depths including ~10 meters, ~25 meters, ~50 meters, etc. However, in some embodiments, as will be described below, the shallowest streamer is towed above a particular minimum depth.

Towing a streamer at a particular depth does not imply that every part of the streamer remains exactly at the particular depth at every point in time. Rather, towing a streamer at a particular depth is typically associated with an acceptable amount of deviation from the depth. For example, survey vessel 10 may tow a streamer at a depth of 50 meters with an acceptable deviation of 5 meters (10% in this situation), meaning that parts of the streamer may be as deep as 55 meters or as shallow as 45 meters. Further, streamers may be towed using non-horizontal depth profiles with different portions of a streamer towed at different target depths. However, in some embodiments, survey data may be improved if a given portion of a towed streamer is as close to a desired towing depth as possible in given survey conditions. Similarly, when one streamer is towed "directly above" another streamer, the two streamers will typically not be perfectly aligned during operation, but may slightly deviate from alignment. Thus, various acceptable deviations may occur in various embodiments.

This disclosure first describes wave separation techniques for a single streamer, and then describes exemplary embodiments of wave separation techniques for streamers towed at different depths.

Wave Separation Techniques for a Single Streamer

With a dual-sensor or multi-component towed streamer comprising both pressure sensors and motion sensors, the up-going and down-going wavefields may be separated, through scaled or weighted summation of the measured wavefield components, for example. In some embodiments, the up-going and down-going pressure wavefields, Pu and Pd, respectively, may be calculated from the measured pressure wavefield P and vertical velocity wavefield component Vz and expressed in the frequency domain as follows:

$$P_u = \frac{1}{2}\left[P - \frac{\rho\omega}{k_z}V_z\right] \quad (1)$$

and $$P_d = \frac{1}{2}\left[P + \frac{\rho\omega}{k_z}V_z\right] \quad (2)$$

where $\omega$ is angular frequency, $\rho$ is water density, and $k_z$ is vertical wave number in the z direction, given by:

$$k_z = \sqrt{\left(\frac{\omega}{c}\right)^2 - k_x^2 - k_y^2} \quad (3)$$

where c is the speed of sound in water (typically ~1500 meters per second), and $k_x$ and $k_y$ are the horizontal wave numbers in the x direction (typically inline, parallel to streamers 20) and y direction (typically cross-line, perpendicular to the towing direction), respectively. In other embodiments, other wave separation equations may be utilized. The particular equations disclosed herein are not intended to be limiting, but merely illustrate exemplary equations for various determinations. Generally, wave separation equations allow separation of up-going and down-going waves based on data that includes measurements of both pressure and particle motion or pressure gradient data.

However, as mentioned above, ghost signals may interfere with measurements of the pressure wavefield and the vertical velocity wavefield component. The ghost functions (which result from a combination of the up-going wavefield and ghosted signals) for the pressure $G_P$ and the particle velocity $G_{V_z}$ may be expressed as:

$$G_P = 1 + re^{-i2zk_z} \quad (4A)$$

and $$G_{V_z} = 1 - re^{-i2zk_z} \quad (4B)$$

where r is the reflection coefficient of the sea surface and z is the receiver depth (e.g., z1 or z2 in the illustrated embodiment).

Referring now to FIG. 3, a graph illustrating the amplitude of theoretical ghost functions in one embodiment versus frequency of a wavefield signal is shown. In the illustrated embodiment, the dotted line represents the vertical velocity ghost function $G_{V_z}$ while the solid line represents the pressure ghost function $G_P$ for receivers at a depth of about 25 meters. In the illustrated embodiment, both functions are illustrated for a wavefield signal at zero degree emergent angle to simplify explanation.

At zero degree emergent angle relative to the vertical (e.g., a wavefield signal coming straight up to a geophysical sensor 22 or 29), $k_x$ and $k_y$ are zero. In this particular case, the ghost functions in equations (4A) and (4B) may be written as $$G_P = 1 + re^{-i2z\omega/c} \quad (5A)$$

and $$G_{V_z} = 1 - re^{-i2z\omega/c} \quad (5B)$$

and the reflection coefficient r at the sea surface is typically close to −1.

As shown, the pressure ghost function has notches where $e^{-i2z\omega/c} = 1$, which is when $2z\omega/c = 0$, $2\pi$, $4\pi$, etc. Thus, the notches occur at $nc/2z$ Hz, where n is 0, 1, 2, etc. Similarly, the particle velocity ghost function has notches where $e^{-i2z\omega/c} = -1$, which is when $2z\omega/c = \pi$, $3\pi$, $5\pi$, etc. Thus, the notches occur at $mc/4z$ Hz, where m is 1, 3, 5, etc. A notch may occur when the ghosted signal and up-going wavefield signal destructively interfere, resulting in inability to measure a wavefield signal at that particular frequency. In contrast, at the peaks in FIG. 3 (at approximately 6 dB), the ghosted signal and up-going wavefield signal may constructively interfere, resulting in a stronger wavefield signal at that particular frequency. The term "notch" refers to a dip in the strength of a measured wavefield signal at a particular frequency; in the case of destructive interference, the strength of the wavefield signal may be at or near zero, as shown.

As shown, where the pressure ghost function has a notch, there is a peak in the particle velocity ghost function and vice versa. Therefore, these ghost functions typically complement each other. Also note that the pressure ghost function has a notch at 0 Hz, and that the amplitudes roll off below the peak at 15 Hz. Therefore, pressure measurements typically have limited amplitudes at very low frequencies.

In the illustrated diagram, it appears that the particle velocity measurements can be used to fill in the notch at 0 Hz in the pressure measurements. However, in practice, noise levels in the low-frequency end of the spectrum typically interfere with measured signals from motion sensors. Low-frequency noise may originate from a variety of sources, including vibration in towed streamers, for example. Low-frequency noise may vary in different geophysical survey systems. In some embodiments, particle motion sensors are noisier than pressure sensors up to about 30-40 Hz. However, the noise may be reduced by combining particle motion and pressure data. For example, U.S. Pat. No. 7,359,283 describes techniques "for combining signals of pressure sensors and particle motion sensors in marine seismic streamers."

In some embodiments, the vertical particle velocity may be estimated from the pressure measurements using the following expression:

$$V'_z = -\frac{k_z}{\rho\omega} \frac{1 - re^{-i2zk_z}}{1 + re^{-i2zk_z}} P \quad (6)$$

where $V'_z$ is the estimated vertical velocity wavefield and P is the measured total pressure wavefield. In some embodiments, the low-frequency part of the measured vertical particle velocity is modified (e.g., replaced by, combined with, or adjusted based on) the low-frequency part of the estimated vertical particle velocity to generate a rebuilt (reb) vertical particle velocity signal. For example, this modification may be performed using the equation:

$$V_z^{reb} = F_L V'_z + F_H V_z \quad (7)$$

where $F_L$ and $F_H$ are corresponding low-pass and high-pass filters, for example such that:

$$F_L + F_H = 1 \quad (8)$$

In one embodiment, the low-/high-pass corner frequency may be set such that it between 0 Hz and the first ghost notch above 0 Hz in the pressure wavefield (notch 320 in the illustrated diagram). Said another way, it may be set below $c/2z$ Hz for zero degree emergent angle. In some embodiments, filters may implement any of various tapering techniques near cutoff points. In other embodiments, any of various appropriate techniques may be used to modify particle velocity signals using particle velocity information that is estimated based on pressure measurements with particle velocity signals, e.g., in place of and/or in addition to such filters. As used herein, "modifying" a signal typically refers to modifying data that represents the signal. For example, $V_z^{reb}$ may be described as produced by modifying $V_z$ using estimated particle velocity information.

The output from equation (7) may be used as input in equations (1) and (2) to determine the wave separation. However, because the low-frequency part of the particle velocity measurements is replaced with an estimated particle velocity wavefield calculated from the total pressure wavefield, the wavefield signal levels in the low-frequency end may be limited by the roll-off of the pressure ghost function near 0 Hz.

One way of increasing the strength of the measured pressure signal in the low-frequency end may be to tow the streamer at a greater depth. However, this may cause the pressure ghost notch 320 at $c/2z$ Hz (where the particle velocity measurements are used to fill in the notch) to occur at too low a frequency. At such low frequencies, the measurements from the particle motion sensors may be too noisy to allow covering the notch 320 with particle motion data. Therefore, this may limit how deep a multi-component streamer can be towed in practice before causing notches in the measured spectrum, in some embodiments.

In some embodiments with streamers at different depths, a shallowest streamer may be shallow enough such that a ghost function for pressure sensors on the shallowest streamer does not have a notch that falls within a frequency range in which noise in measured particle motion signals is greater than noise in measured pressure signals. This may allow covering of the notches in the pressure signal from the shallowest streamer by particle motion data. Low-frequency noise may cause particle velocity signals to be noisier than pressure signals in the low frequency end (e.g., from 0 to about 15-50 Hz) with the frequency range varying for different types of streamers and/or different survey conditions. In some embodiments, a shallowest streamer may be towed at a depth of about 15 to 50 meters.

Wave Separation Techniques Using Streamers at Different Depths

In some embodiments, pressure data from one or more deeper streamers is used to estimate low-frequency particle velocity signals. This may improve estimates of low-frequency particle motion data because of increased strength of low-frequency pressure signals measured by the deeper streamer.

Referring now to FIG. 4, a diagram illustrating ghost functions including a theoretical pressure ghost function for a greater streamer depth is shown. In the illustrated embodiment, a pressure ghost function for a sensor towed at about 100 meters is shown using a dashed line while the particle velocity and pressure ghost functions for a sensor towed at about 25 meters are shown using dotted and solid lines respectively. As shown, the first pressure notch after 0 Hz for the 100 meter streamer has moved closer to 0 Hz compared to the ghost function of a sensor on the 25 meter streamer. However, the amplitude has also increased in the low-frequency end of the spectrum compared to the ghost function at 25 meters. For example, the peak at point 420 is significantly higher than the signal level in the 25 meter ghost function at the same frequency. Further, in some embodiments, pressure signals from the 25 meter pressure sensor may be used to fill in the first notch after 0 Hz in the pressure signals from the 100 meter pressure sensor. This may result in survey results with strong low-frequency signals and without significant notches over a wide spectrum.

Referring now to FIG. 5, a diagram illustrating ghost functions for pressure sensors at different depths on a logarithmic frequency scale is shown. As shown, for a frequency range from 0 Hz up to about 3 Hz (i.e., frequency range 550), the ghost function for the 100 meter pressure sensor depth is about 10-12 dB above the ghost function for the 25 meter pressure sensor depth. Therefore, particle velocity information estimated based on the deeper streamer may be more accurate, e.g., because of a higher signal to noise ratio in the signals from the deeper streamer. Various techniques for combining geophysical data from streamers at different depths are described below.

In various embodiments, combining data from streamers at different depths may require transforming the data from one or more of the streamers to the same datum level in order to provide an accurate estimate of the particle velocity signal from the pressure data from the deep streamer. For example, in one embodiment, a computing system is configured to apply a redatuming from the depth level of the deep streamer to the depth level of the shallower streamer and calculate the vertical particle velocity wavefield at a datum level equivalent to the shallower streamer. In one embodiment, this may be performed using the equation:

$$V_z'' = -\frac{k_z}{\rho\omega}\frac{1-re^{-i2zk_z}}{1+re^{-i2zk_z}}e^{-ik_z(z2-z1)}P_2 \quad (9)$$

where z1 is the depth of the shallower streamer, z2 is the depth of the deeper streamer, and $P_2$ is the total pressure wavefield measured by the deep streamer. The term $e^{-ik_z(z2-z1)}$ represents a redatuming from depth z2 to depth z1. In one embodiment, this second estimate ($V_z''$) of the particle velocity wavefield may be combined with the estimated particle velocity wavefield and the measured particle velocity wavefield from the shallower streamer using the equation:

$$V_z^{reb}=F_{L2}(F_{L1}V_z''+F_{H1}V_z')+F_{H2}V_z \quad (10)$$

where $F_{L1}$ and $F_{H1}$ are corresponding low-pass and high-pass filters for applying to the estimated particle motion information and $F_{L2}$ and $F_{H2}$ are corresponding low- and high-pass filters to be applied for merging the estimated particle motion information with the measured particle velocity wavefields. In one embodiment, $F_{L1}$ may have a cutoff frequency near the higher-frequency end of frequency range 550 and $F_{H1}$ may have a cutoff frequency near the lower-frequency end of frequency range 560. Frequency ranges 550 and 560 may be referred to as first and second portions of a low-frequency range of a measured signal. For example, pressure data from pressure signals at different depths may be used to estimate particle motion information in frequency ranges 550 and 560, which may in turn be used to modify first and second portions of a low-frequency range of a measured particle motion signal. In the illustrated embodiment, frequency range 560 is a higher-frequency portion of the low frequency range than frequency range 550. In some embodiments, the resulting particle velocity wavefield $V_z^{reb}$ from equation (10) may be used as input to a wave separation computation (e.g., in place of V when using equations (1) and (2)).

In some embodiments, $F_{L1}$ may have a cutoff frequency between 2 Hz and 4 Hz. In some embodiments, $F_{L2}$ may have a cutoff frequency between 10 Hz and 40 Hz. In some embodiments, $F_{L1}$ and $F_{H1}$ may be set based on the peaks in ghost functions for streamers. For example, for a deepest streamer, $F_{L1}$ may be set to have a cutoff frequency within 1 Hz of a peak in a ghost function for that streamer. Other filter ranges may similarly be set to within 1 Hz, 2 Hz, 4 Hz, etc. of a corresponding peak in a ghost function for the particular streamer. In other embodiments, filter cutoff frequencies may be set based on other considerations.

In other embodiments, alternative ways of combining estimated and measured particle velocity wavefields may be used. For example, in some embodiments, a weighted summation of the wavefields either using deterministic or optimized weights (e.g. based on determined signal to noise ratio in the different measurements) may be used. For example, in one embodiment, different weight factors may be determined for estimated particle motion information and measured particle motion information, and the estimated and measured information may be combined based on the weight factors. In some embodiments, the weight factors are determined based on signal to noise ratios associated with the estimated particle motion information and measured particle motion signal. In other embodiments, the weight factors may be based on other criteria.

In some embodiments, pressure sensors on one or more deeper streamers may be sparsely distributed relative to pressure sensors on a shallower streamer. For example, a shallower streamer may include 1.5-10 times as many pressure sensors along a given interval as a deeper streamer in some embodiments without significantly impacting survey resolution. This may be achievable because the deeper pressure sensors are used only for estimations based on lower-frequency measurements in these embodiments. Further, as shown in the embodiment of FIG. 2, deeper streamers such as streamer 20B may not include particle velocity sensors. This may reduce the cost and/or complexity of deeper streamers. Reducing complexity of streamers may reduce drag and/or noise produced by streamers. Further, some geophysical survey systems may implement deeper streamers with EM sensors, for example. In some embodiments, pressure sensors may be added to existing EM streamers in geophysical survey systems, which may further reduce the cost of such systems.

Figure 6:
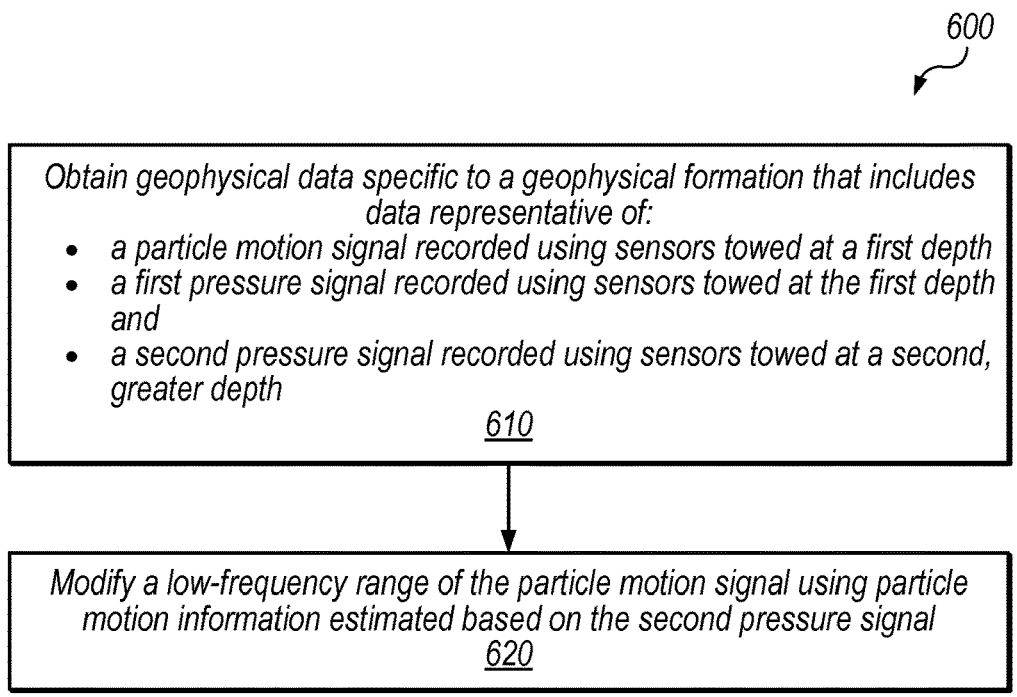
FIG. 6 is a flow diagram illustrating one embodiment of a method for geophysical data processing.

Referring now to FIG. 6, one embodiment of a method 600 for geophysical data processing is shown. The method shown in FIG. 6 may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 610.

At block 610, geophysical data specific to a geophysical formation is obtained. The geophysical data may be obtained by conducting a geophysical survey or accessing data from a geophysical survey, for example. In this embodiment, the geophysical data is representative of:
- a particle motion signal recorded using sensors towed at a first depth
- a first pressure signal recorded using sensors towed at the first depth, and
- a second pressure signal recorded using sensors towed at a second, greater depth Flow proceeds to block 620.

At block 620, a low-frequency range of the particle motion signal is modified using particle motion information that is estimated based on the second pressure signal. This may improve resolution in processing the geophysical data, e.g., by replacing noisy low-frequency particle motion measurements. Flow ends at block 620.

Figure 7:
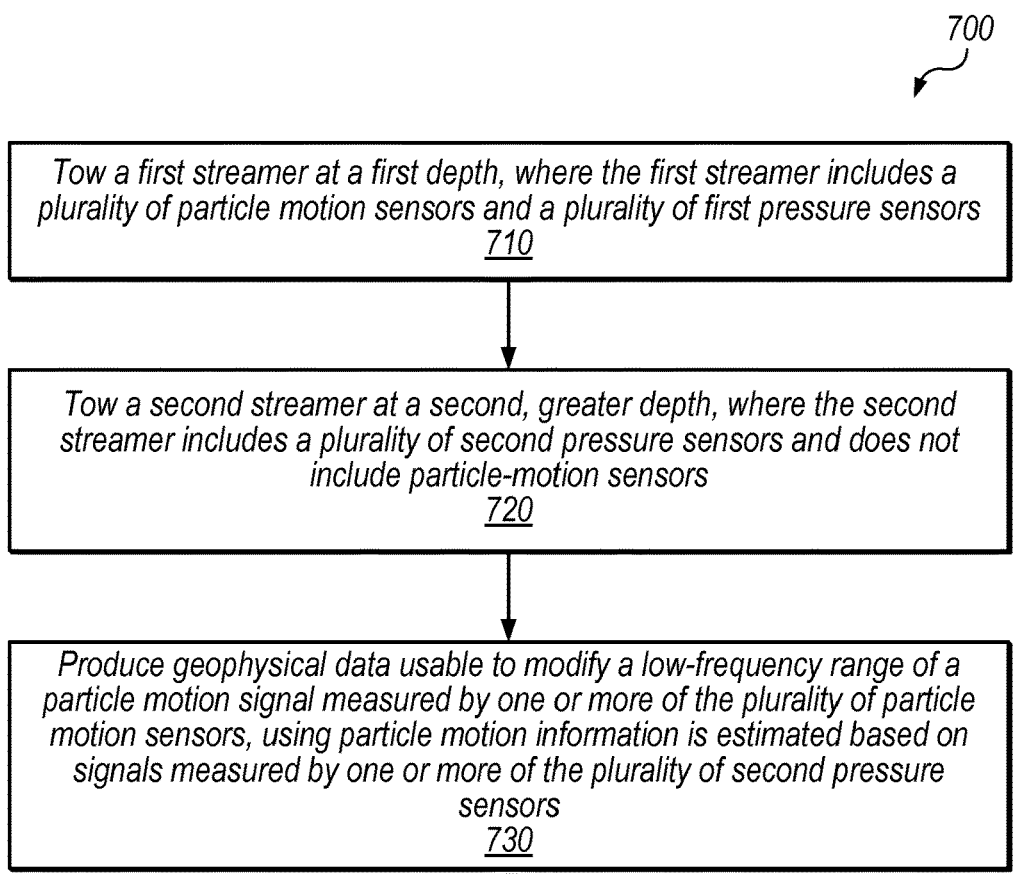
FIG. 7 is a flow diagram illustrating one embodiment of a method for generating a geophysical data product.

Referring now to FIG. 7, one embodiment of a method 700 for generating a geophysical data product is shown. The method shown in FIG. 7 may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, a first streamer is towed at a first depth. In this embodiment, the streamer includes a plurality of particle motion sensors and a plurality of first pressure sensors. In one embodiment, the first depth is less than 25 meters. Flow proceeds to block 720.

At block 720, a second streamer is towed at a second, greater depth. In this embodiment, the second streamer includes a plurality of second pressure sensors and does not include particle motion sensors. In some embodiments, the number of pressure sensors on the second streamer is smaller than the number of pressure sensors on the first streamer. Thus, the second streamer may be relatively simple and inexpensive in comparison with the first streamer. Flow proceeds to block 730.

At block 730, geophysical data is produced that is usable to modify a low-frequency range of a particle motion signal measured by one or more of the plurality of particle motion sensors. In this embodiment, the geophysical data is usable to modify the low-frequency range using particle motion information estimated based on signals measured by one or more of the plurality of second pressure sensors. Such modification may be performed using various techniques, including those described above with reference to FIGS. 3-5. Flow ends at block 730.

In some embodiments, the method of FIG. 7 may be utilized to generate the geophysical data obtained in the method of FIG. 6.

Inversion Techniques Using Streamers at Different Depths

In one embodiment, both shallow and the deep streamers are multi-component streamers, e.g., having both pressure particle motion sensors. In this embodiment, separated wavefields based on sensor data at different depths should typically be the same. Thus, in this embodiment, the wave separation may be performed using an inversion. Typically, the parameter that is normally unknown in wave separation equations is the horizontal wave number in the cross-line direction, $k_y$, (e.g., due to the poor spatial sampling of receivers in the cross-line direction with towed streamer seismic). Before performing the inversion, equations for one or both of the deep and shallow streamers may be transformed so that the equations represent the same datum level. For example, in one embodiment with a shallower streamer and a deeper streamer, the up-going pressure wavefield from the shallower multi-component streamer, at a datum level $z_d$, may be described as:

$$P_{u1} = \frac{1}{2}\left[P_1 - \frac{\rho\omega}{k_z}V_{z1}\right]e^{-ik_z(z1-zd)} \quad (11)$$

$$= \frac{1}{2}\left[P_1 - \frac{\rho\omega}{\sqrt{\left(\frac{\omega}{c}\right)^2 - k_x^2 - k_y^2}}V_{z1}\right]e^{-i\sqrt{\left(\frac{\omega}{c}\right)^2 - k_x^2 - k_y^2}(z1-zd)}$$

Similarly, the up-going pressure wavefield from the deeper multi-component streamer, at the same datum level $Z_d$, may be described as:

$$P_{u2} = \frac{1}{2}\left[P_2 - \frac{\rho\omega}{k_z}V_{z2}\right]e^{-ik_z(z2-zd)} \quad (12)$$

$$= \frac{1}{2}\left[P_2 - \frac{\rho\omega}{\sqrt{\left(\frac{\omega}{c}\right)^2 - k_x^2 - k_y^2}}V_{z2}\right]e^{-i\sqrt{\left(\frac{\omega}{c}\right)^2 - k_x^2 - k_y^2}(z2-zd)}$$

In equations (11) and (12), the subscripts 1 and 2 (e.g., as used in $P_1$ and $V_{z2}$) refer to a shallower and a deeper streamer respectively.

In one embodiment, performing an inversion involves reconciling equations (11) and (12) such that $P_{u1}$ and $P_{u2}$ are the roughly equivalent. In some embodiments, this involves determining a cross-line horizontal wavenumber parameter that best reconciles the two equations. In embodiments in which two wave separation equations are associated with the same datum level, reconciling the two equations involves finding a parameter such that the equations give substantially the same result. Because, in various embodiments, the sensors on different streamers are detecting the same wavefields at different locations, wave separation equations using data from different streamers should generate approximately the same results, which may allow the inversion analysis to determine the cross-line horizontal wave number parameter. Once the cross-line horizontal wave number is determined, it may be used in equation (11) and/or (12) to determine the up-going pressure wavefield and/or up-going particle velocity wavefield. In other embodiments, similar inversions may be performed using other types of wave separation equations, the present disclosure is not limited to the particular equations (11) and (12).

This embodiment may provide an efficient technique for determining cross-line wave number for use in separating up-going and down-going wavefields. In other embodiments, other parameters may be solved for by reconciling wave separation equations. Such parameters may include water velocity or a check for sensor calibration errors (which may lead to differences between the two equations).

In some embodiments, a computing system, also referred to as a geophysical data processing system, may be configured to perform various techniques described with reference to FIGS. 2-6 in combinations with these inversion techniques. For example, in one embodiment, $V_{z1}$ in equation (11) is replaced with a rebuilt particle velocity wavefield (e.g., generated using equation 10) in which low-frequency particle velocity signals are modified using particle velocity information that is estimated based on pressure signals from the deeper streamer (e.g., $P_2$). In other embodiments, $V_{z1}$ in equation 11 may be replaced with rebuilt particle velocity wavefields generated using equations (6) and (7), and/or other techniques. This may result in even greater survey resolution than embodiments in which an inversion is performed without replacing or modifying low-frequency portions of particle velocity signals.

In various embodiments, wave separation models may include various equations such as equations (11) and (12). Speaking generally, determining a parameter that reconciles sets of data in a wave separation model refers to determining a parameter that gives the most similar results for the two sets of data.

Figure 8:
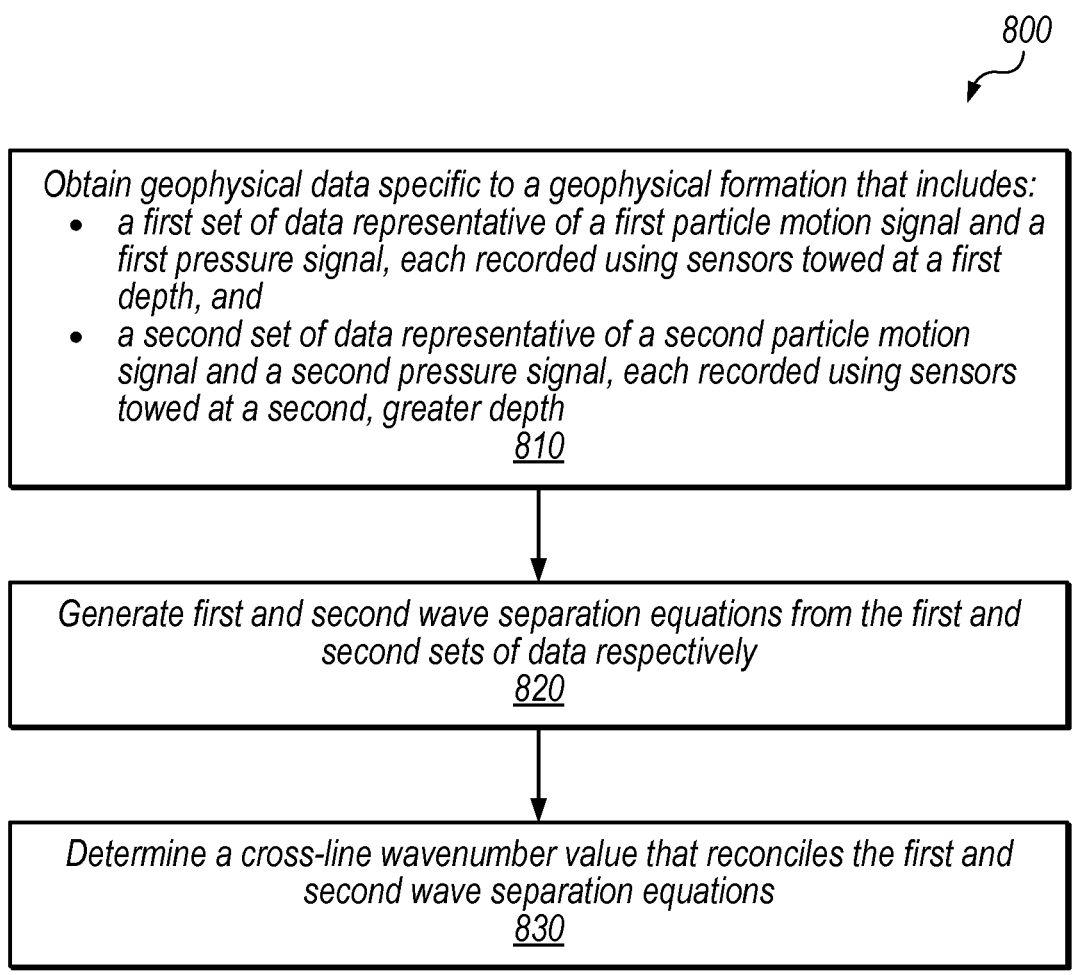
FIG. 8 is a flow diagram illustrating another embodiment of a method for geophysical data processing.

Referring now to FIG. 8, one embodiment of a method 800 for geophysical data processing is shown. The method shown in FIG. 8 may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 810.

At block 810, geophysical data specific to a geophysical formation is obtained. The geophysical data may be obtained by conducting a geophysical survey or accessing data from a geophysical survey, for example. In this embodiment, the geophysical data is representative of:

a first set of data representative of a first particle motion signal and a first pressure signal, each recorded using sensors towed at a first depth, and a second set of data representative of a second particle motion signal and a second pressure signal, each recorded using sensors towed at a second, greater depth Flow proceeds to block 820.

At block 820, first and second wave separation equations are generated from the first and second sets of data. This may include setting parameter values for the first and second wave separation equations based on the first and second sets of data. The first and second sets of data may each include a cross-line waver number parameter, which may be difficult to determine using data from one or more streamers at a same given depth. Flow proceeds to block 830.

At block 830, a cross-line wave number value that reconciles the first and second wave separation equations is determined. In some embodiments, the cross-line wave number value may be used in the first and second wave separation equations to separate measured up-going and down-going wavefields. As discussed above, in some embodiments, a redatuming of one or more of the wavefields may be needed in order to compare and reconcile the wavefields. Flow ends at block 830.

In some embodiments, a geophysical data product may be produced. The geophysical data product may include processed geophysical data and may be stored on a non-transitory, tangible computer-readable medium. The geophysical data product may be produced offshore (i.e. by equipment on a survey vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of geophysical data processing, comprising:
   obtaining, at a geophysical data processing system, geophysical data specific to a geophysical formation, wherein the geophysical data includes:
      a first set of data representative of a first particle motion signal and a first pressure signal, wherein the first particle motion signal and the first pressure signal are each recorded using geophysical sensors towed at a first depth; and
      a second set of data representative of a second particle motion signal and a second pressure signal, wherein the second particle motion signal and the second pressure signal are each recorded using geophysical sensors towed at a second, greater depth;
   generating, by the geophysical data processing system, information corresponding to first and second wave separation equations from the first and second sets of data respectively, wherein the first and second wave separation equations each include a cross-line wave number parameter;
   determining, by the geophysical data processing system, a cross-line wave number value for the cross-line wave number parameter based on a corresponding difference in results between up-going pressure wavefields for the first and second equations;
   processing the geophysical data to determine an up-going wavefield using the determined cross-line wave number value; and
   generating an image of the geophysical formation based on the determined up-going wavefield.

2. The method of claim 1, wherein the determining the cross-line wave number value involves an inversion and minimizes the difference in results.

3. The method of claim 1, further comprising:
   separating up-going and down-going particle motion and pressure wavefields using the determined cross-line wave number.

4. The method of claim 1, wherein one or both of the first and second wave separation equations include a transform to a particular datum level.

5. The method of claim 1, further comprising transforming one or both of the first and second wave separation equations such that the equations correspond to a same datum level.

6. The method of claim 1, further comprising removing low-frequency particle motion signals from the first set of data.

7. The method of claim 1, further comprising:
modifying a low-frequency range of one or both of the first and second particle motion signals using particle motion information estimated based on one or both of the first and second pressure signals; and
using the modified one or both of the first and second particle motion signals in one or both of the first and second wave separation equations.

8. The method of claim 1, wherein the first depth is at most 30 meters.

9. The method of claim 1, wherein obtaining geophysical data comprises at least one of conducting a geophysical survey or accessing data from a single geophysical survey.

10. The method of claim 1, further comprising producing a model of at least a portion of the geophysical formation.

11. A non-transitory computer-readable storage medium having instructions stored thereon that are executable by a computing device to perform operations comprising:
obtaining geophysical data from a geophysical formation, wherein the geophysical data includes:
a first set of data representative of a first particle motion signal and a first pressure signal, wherein the first particle motion signal and the first pressure signal are each recorded using geophysical sensors towed at a first depth; and
a second set of data representative of a second particle velocity signal and a second pressure signal, wherein the first particle motion signal and the first pressure signal are each recorded using geophysical sensors towed at a second, greater depth;
generating a wave separation model that includes a cross-line wave number parameter; and
determining a cross-line wave number value for the cross-line wave number parameter based on a corresponding difference in results between up-going pressure wavefields for the first and second sets of data; and
generating an image of the geophysical formation based on the determined cross-line wave number parameter.

12. The non-transitory computer-readable storage medium of claim 11, wherein the operations further comprise separating up-going and down-going particle motion wavefields using the determined cross-line wave number.

13. The non-transitory computer-readable storage medium of claim 11, further comprising transforming one or both of the first and second sets of data to a particular datum level.

14. The non-transitory computer-readable storage medium of claim 11, wherein the operations further comprise removing low-frequency particle motion signals from the first set of data.

15. The non-transitory computer-readable storage medium of claim 11, wherein the wave separation model includes a first wave separation equation for the first set of data and a second wave separation equation for the second set of data, wherein each of the first and second wave separation equations includes a cross-line wave number parameter.

16. The non-transitory computer-readable storage medium of claim 11, wherein obtaining geophysical data comprises at least one of conducting a geophysical survey or accessing data from a single geophysical survey.

17. In a technological method of imaging subterranean geological structures that includes:
obtaining, at a geophysical data processing system, geophysical data specific to a geophysical formation, wherein the geophysical data includes:
a first set of data representative of a first particle motion signal and a first pressure signal, wherein the first particle motion signal and the first pressure signal are each recorded using geophysical sensors towed at a first depth; and
a second set of data representative of a second particle motion signal and a second pressure signal, wherein the second particle motion signal and the second pressure signal are each recorded using geophysical sensors towed at a second, greater depth;
the specific improvement comprising:
generating, by the geophysical data processing system, information corresponding to first and second wave separation equations from the first and second sets of data respectively, wherein the first and second wave separation equations each include a cross-line wave number parameter;
determining, by the geophysical data processing system, a cross-line wave number value for the cross-line wave number parameter that minimizes a difference between an up-going pressure field for the first equation and an up-going pressure field for the second equation; and
generating an image of the geophysical formation based on the determined cross-line wave number value, thereby providing increased resolution for the image.

18. The method of claim 17, wherein the determining minimizes the difference in results.

* * * * *